Sept. 12, 1950 V. R. WILL 2,521,815
BED MOUNTED FOR TRANSPORT ON AN AUTOMOBILE
Filed Aug. 12, 1946 3 Sheets-Sheet 1
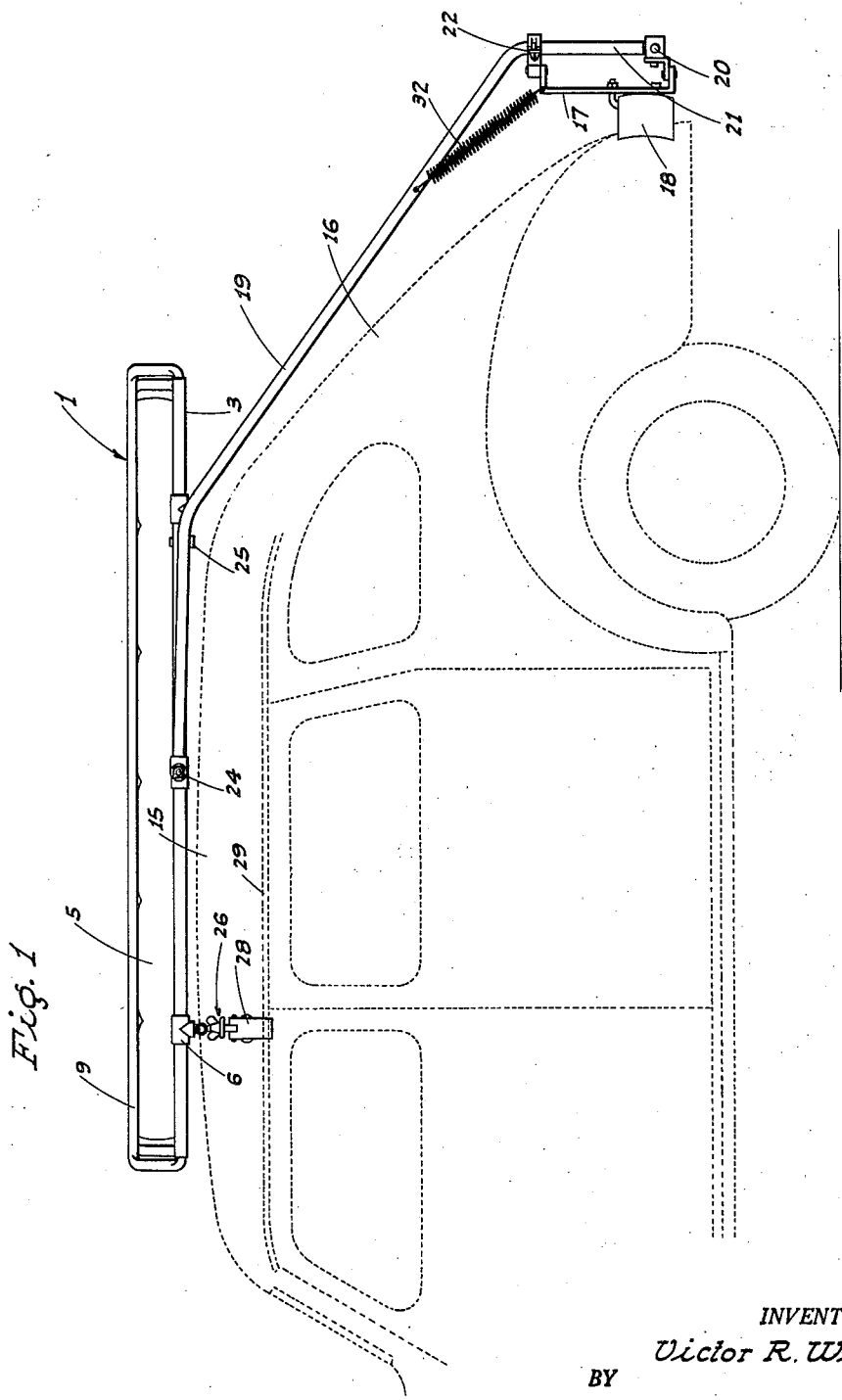
INVENTOR.
Victor R. Will
BY
ATTYS Sept. 12, 1950 V. R. WILL 2,521,815
BED MOUNTED FOR TRANSPORT ON AN AUTOMOBILE
Filed Aug. 12, 1946 3 Sheets-Sheet 2
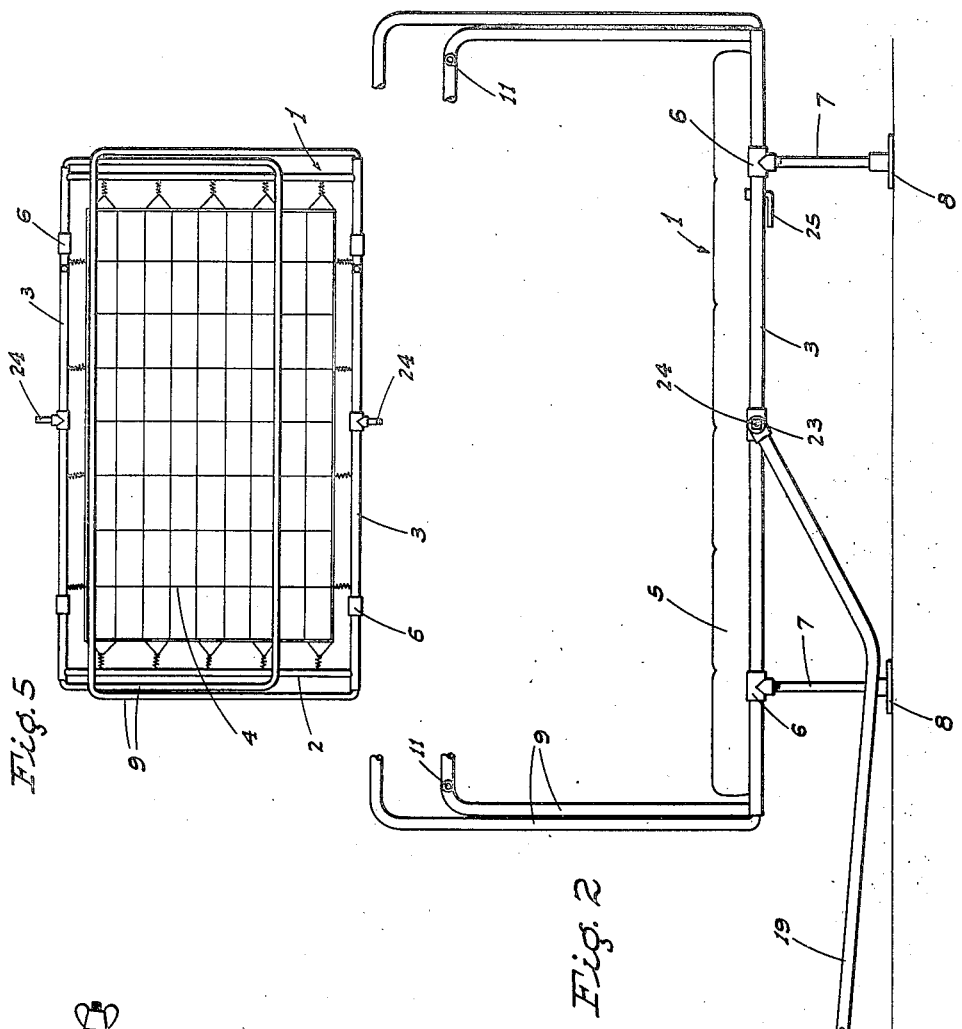
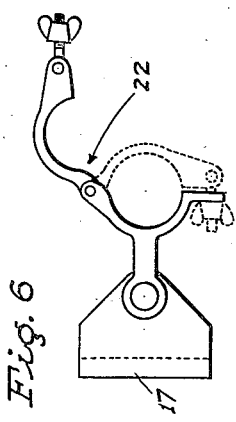
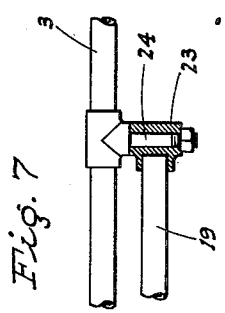
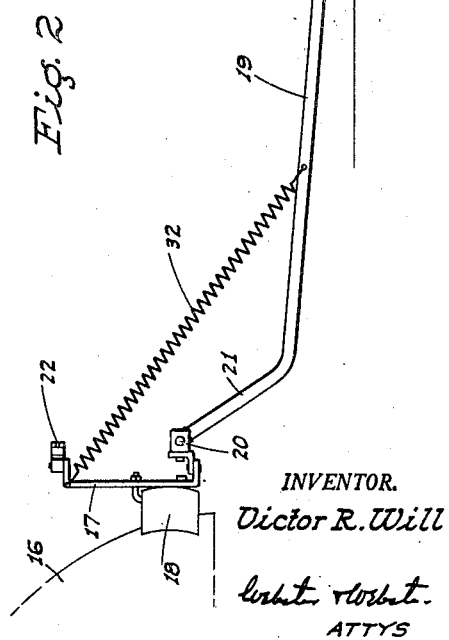
INVENTOR.
Victor R. Will
ATTYS Sept. 12, 1950  V. R. WILL  2,521,815
BED MOUNTED FOR TRANSPORT ON AN AUTOMOBILE
Filed Aug. 12, 1946  3 Sheets-Sheet 3
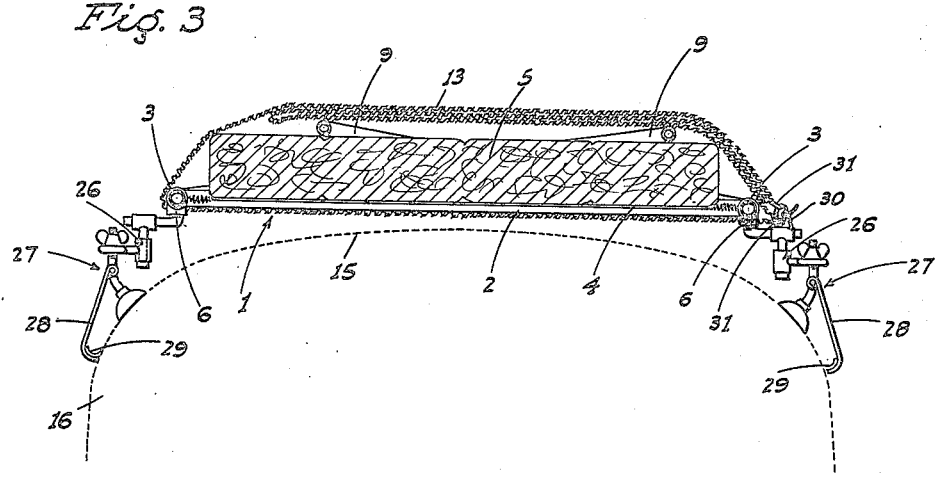
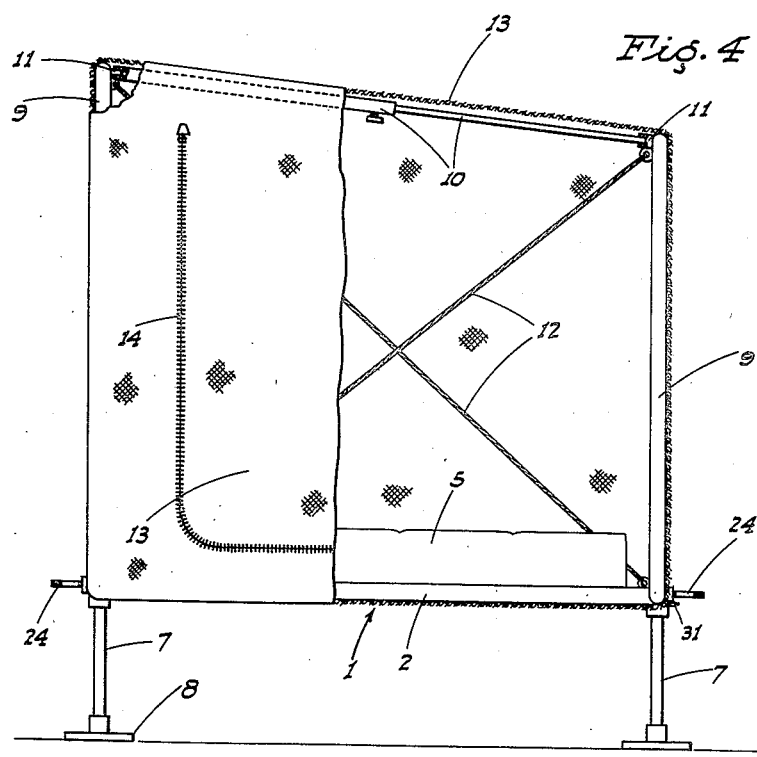
INVENTOR.
Victor R. Will
BY
ATTYS Patented Sept. 12, 1950

2,521,815

UNITED STATES PATENT OFFICE 2,521,815

BED MOUNTED FOR TRANSPORT ON AN AUTOMOBILE

Victor Ray Will, Sacramento, Calif.

Application August 12, 1946, Serial No. 689,867

4 Claims. (Cl. 5—119)

This invention is directed to, and it is an object to provide, a novel portable bed adapted particularly for use in connection with an automobile; the bed being mounted in novel manner for swinging movement from a folded position atop the automobile, to a ground engaging, unfolded position to the rear of the automobile.

Another object of the invention is to provide a portable bed which can be easily and quickly manipulated between folded, carrying position, and unfolded position for use.

A further object of the invention is to arrange the bed for detachment from its mount so that the bed may be used separate from said mount and the automobile, as may be desirable under certain conditions.

An additional object of the invention is to provide the bed with an enclosing tent, and novel tent supporting means which fold into a compact unit when the bed is in carrying position.

It is also an object of the invention to provide a portable bed, of the type described, wherein the mattress and bedding remain in place when the bed is in folded, carrying position.

A further object of the invention is to provide a practical portable bed, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the portable bed in folded carrying position on an automobile; the tent being removed for the purpose of clarity.

Fig. 2 is a side elevation of the portable bed in unfolded position for use, the tent likewise being removed.

Fig. 3 is an enlarged cross section of the portable bed in folded transport position, illustrating the tent thereon and the manner of attachment of the bed to the automobile top.

Fig. 4 is an end view, partly broken away, of the bed in use, particularly detached from the swing arms.

Fig. 5 is a plan view of the bed unit, folded.

Fig. 6 is a fragmentary plan view illustrating one of the releasable clamps.

Fig. 7 is a fragmentary plan view partly in section showing the connection between the swing arms and the bed frame.

Referring now more particularly to the characters of reference on the drawings, the invention includes a bed unit, indicated generally at 1, which bed unit comprises a rectangular bed frame 2 having parallel side bars 3. The bed frame 2 is fitted with a set of flat bed springs 4, on which a mattress 5 is adapted to rest. Adjacent opposite ends thereof the side bars 3 include fittings 6, into which legs 7 are removably threaded; said legs including feet 8.

Each of the side bars 3 of the bed frame 2 is fitted with an elongated, generally U-shaped side frame 9, which side frames are pivoted in connection with the ends of the side bars 3 for swinging movement from a downwardly folded position, as in Figs. 1 and 5, to an upright position, as in Figs. 2 and 4. One of the side frames 9 is shorter than the other, yet symmetrical thereto, whereby said shorter frame may swing through the other when being folded or erected.

When the bed unit 1 is in use, and supported by the legs 7 from the ground, the side frames 9 are swung upward from folded position to erected position, and there maintained in said latter position by extensible braces 10 which connect between attachment elements 11 at the top corners of said side frames 9. Additionally, diagonal guy cords 12 limit upward movement of the side frames 9 to substantially vertical, and thereafter prevent swaying thereof.

A generally box-shaped tent 13 surrounds the above described bed unit and is supported, when the same is unfolded, by the side frames 9, in the manner clearly illustrated in Fig. 4. At one end the tent 13 includes an endless slide fastener 14 to provide access into the tent and to the bed.

The above described bed unit 1 is mounted for swinging movement between a folded carrying position above the top 15 of an automobile 16, to a ground engaging position for use to the rear of the automobile, by means of the following mount:

A pair of upstanding brackets 17 are fixed on the rear bumper 18 of the automobile, and a pair of longitudinally extending, transversely spaced swing arms 19 are pivoted, at one end, to the brackets 17, as at 20, for swinging movement from an upwardly and forwardly inclined position overhanging the top 15 of the automobile, as in Fig. 1, to a rearwardly projecting position adjacent the ground, as in Fig. 2. The arms are formed so that when in such upwardly and forwardly inclined position they are generally symmetrical to the automobile 16, but include vertical legs 21 then substantially parallel to the upstanding bracket 17. In this position of the swing arms 19, the legs 21 are attached to the bracket 17 by releasable clamps 22, one of which is shown in detail in Fig. 6.

At its normally forward or free ends the swing arms 19 are fitted with transverse sleeves 23 which turnably and removably engage with corresponding studs 24 which project laterally outwardly from the bed frame 2 centrally of the ends of the side bars 3. By reason of this arrangement the bed unit 1 is normally secured in connection with the mount, but can be detached therefrom for separate use, as in Fig. 4.

When the bed unit is in its folded carrying position above the top 15 of the automobile 16, stops 25 are swung out from beneath the side bars 3 to engagement under the swing arms 19 rearwardly of the then forward ends of said swing arms. On opposite sides of the bed frame 2 the then forward fittings 6, from which the legs 7 are removed, are threadingly engaged by one member of adjustable and releasable couplings 26 attached to tie and suction cup units 27 which cooperate with the top 15, and each of which units includes a hook 28 engaging beneath the adjacent gutter 29. In this manner the forward end of the folded bed unit 1 is secured against bouncing when the automobile is in motion.

The tent 13 is folded on the bed unit 1, when the latter is in its carrying position, in the manner shown in Fig. 3, and the folded top portion of said tent is tied down by means of tie strings 30 running through grommets 31. In its folded position the bed unit 1 retains the mattress 5 and bedding thereon.

It will be seen that the bed unit 1 can be easily and quickly swung from its folded transport position to a rearwardly disposed position on the ground for use, by merely releasing the couplings 26 and shifting the stops 25 to an inoperative position.

Counterbalance springs 32 serve to prevent too rapid movement of the swing arms 19 upon shifting of the bed unit 1 from folded transport position rearwardly to ground engaging position for use.

Once the bed unit 1 has been disposed adjacent the ground to the rear of the automobile, it is a simple task to attach the legs 7 and to erect the side frames 9 for support of the tent 13 in the manner previously described.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A portable bed unit comprising a bed frame including spaced side bars, a mattress supporting spring set in the frame, a box-like tent enclosing the frame, longitudinal side frames pivoted in connection with the side bars for swinging motion from a downwardly folded position adjacent the spring set to an upstanding, tent erecting position, and means to releasably hold the side frame in said upstanding position; said means including braces detachably connected between the side frames at the top adjacent the ends, and diagonal tie cords connected between the side frames and the bed frame to limit unfolding motion of said side frames.

2. A portable bed unit comprising a bed frame including spaced side bars, a mattress supporting spring set in the frame, a box-like tent enclosing the frame, longitudinal side frames pivoted in connection with the side bars for swinging motion from a downwardly folded position adjacent the spring set to an upstanding, tent erecting position, and means to releasably hold the side frame in said upstanding position; the side frames being of elongated U shape, one being shorter than the other and positioned to swing through the latter to permit of lapping of the side frames when folded.

3. A portable bed for automobiles comprising a bed unit adapted to be normally disposed above the top of an automobile for transport therewith, means mounting the bed unit for swinging motion lengthwise of the automobile from said transport position to a position for ground support beyond one end of the automobile, such means including a pair of transversely spaced longitudinally extending swing arms, means pivotally connecting the arms at one end to the bed unit at points intermediate the ends of said bed unit, and means adapted to pivotally connect the arms at the other end to an end structure of an automobile, portions of said arms extending alongside the bed unit when the latter is in transport position, stops on the bed unit swingable under such portions of the swing arms, and tie down units connected between the forward end portion of the bed unit and the top of the automobile.

4. A portable bed for automobiles comprising a bed unit adapted to be normally disposed above the top of an automobile for transport therewith, means mounting the bed unit for swinging motion lengthwise of the automobile from said transport position to a position for ground support beyond one end of the automobile, such means including a pair of transversely spaced longitudinally extending swing arms, mean pivotally connecting the arms at one end to the bed unit at points intermediate the ends of said bed unit, and means adapted to pivotally connect the arms at the other end to an end structure of an automobile, such latter means including upstanding brackets fixed to said end structure, the swing arms being pivoted to the brackets below the upper ends of the latter and extending upwardly alongside the brackets when the bed unit is in transport position, and releasable clamps on the brackets then engaging the swing arms.

VICTOR RAY WILL.

REFERENCES CITED

The following references are of record in the file of this patent:

UNITED STATES PATENTS

| Number | Name | Date |
|---|---|---|
| 1,004,796 | Lehmann | Oct. 3, 1911 |
| 1,313,760 | Teasdale | Aug. 19, 1919 |
| 1,363,437 | Robertson | Dec. 28, 1920 |
| 1,418,287 | Cooper | June 6, 1922 |
| 2,186,584 | Halvorsen | Jan. 9, 1940 |
| 2,378,448 | Thompson | June 19, 1945 |
| 2,392,008 | Squires | Jan. 1, 1946 |
| 2,479,035 | Burkey | Aug. 16, 1949 |

FOREIGN PATENTS

| Number | Country | Date |
|---|---|---|
| 373,508 | Germany | July 14, 1922 |